(12) United States Patent
Busse et al.

(10) Patent No.: US 7,548,434 B2
(45) Date of Patent: Jun. 16, 2009

(54) DISTRIBUTOR CONNECTION MODULE FOR TELECOMMUNICATION AND DATA TECHNOLOGY

(75) Inventors: Ralf-Dieter Busse, Berlin (DE); Antony Nijhuis, Modautal-Brandau (DE); Harald Klein, Berlin (DE); Joachim Stark, Berlin (DE); Carsten Storbeck, Stahnsdorf (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 10/523,565

(22) PCT Filed: Jul. 18, 2003

(86) PCT No.: PCT/EP03/07880

§ 371 (c)(1),
(2), (4) Date: Oct. 14, 2005

(87) PCT Pub. No.: WO2004/019456

PCT Pub. Date: Mar. 4, 2004

(65) Prior Publication Data

US 2006/0114660 A1    Jun. 1, 2006

(30) Foreign Application Priority Data

Aug. 8, 2002    (DE)    ............... 102 36 361

(51) Int. Cl.
*H02B 1/20*    (2006.01)
(52) U.S. Cl. ...................... 361/827; 361/826
(58) Field of Classification Search .......... 439/676, 439/404, 540.1, 536, 541.5, 607, 79, 941, 439/76.1; 361/825–827
See application file for complete search history.

(56) References Cited

U.S. PATENT DOCUMENTS 4,171,857 A    10/1979    Forberg et al.

(Continued)

FOREIGN PATENT DOCUMENTS

DE    27 25 551    12/1978

(Continued)

OTHER PUBLICATIONS

"Informationstechnischer Anschluβ in anwendungsneutralen Verkabelungssytemen Hinweise, Beispiele, Material", Fachverband Kommunikationstechnik.

(Continued)

*Primary Examiner*—Hung S. Bui
(74) *Attorney, Agent, or Firm*—Merchant & Gould P.C.

(57) ABSTRACT

The invention relates to a distribution box connection module (1) for telecommunications and data technology, comprising a housing in which externally accessible input and output contacts (10, 20, 30, 40) are arranged for the connection of cables and cores, with the housing having a cavity in which at least one printed circuit board (50) is arranged, with the input and output contacts (10, 20, 30, 40) being arranged on the opposite end faces of the housing, and with the input contacts (10, 20) being associated with one input side and the output contacts (30, 40) being associated with one output side, with the input contacts 10, 20 being in the form of at least two mutually opposite rows of contacts, and the output contacts (30, 40) being in the form of at least one plug connector, with at least two input contacts (10) in the first row and at least two input contacts (20) in the second row being connected to the output contacts (30; 40) in the at least one plug connector, and with the input contacts (10, 20) in the first row and in the second row being connected via the at least one printing circuit board (50) to the output contacts (30; 40) in the plug connector.

20 Claims, 4 Drawing Sheets

U.S. PATENT DOCUMENTS

| | | | |
|---|---|---|---|
| 4,767,338 A * | 8/1988 | Dennis et al. | 439/455 |
| 4,777,503 A | 10/1988 | Kramer | |
| 5,459,643 A | 10/1995 | Siemon et al. | 361/785 |
| 5,531,612 A * | 7/1996 | Goodall et al. | 439/541.5 |
| 5,601,451 A | 2/1997 | Driones et al. | |
| 5,754,409 A | 5/1998 | Smith | |
| 6,319,047 B1 * | 11/2001 | Kang | 439/404 |
| 6,358,093 B1 | 3/2002 | Phommachanh et al. | |
| 6,371,780 B1 * | 4/2002 | Aponte et al. | 439/188 |
| 6,419,526 B1 * | 7/2002 | Fair et al. | 439/676 |
| 6,482,039 B2 * | 11/2002 | Phommachanh et al. | 439/620.22 |
| 6,504,726 B1 * | 1/2003 | Grabinger et al. | 361/796 |
| 6,609,929 B2 * | 8/2003 | Kamarauskas et al. | 439/541.5 |
| 6,878,012 B2 * | 4/2005 | Gutierrez et al. | 439/608 |
| 7,037,118 B2 * | 5/2006 | Neumetzler et al. | 439/76.1 |
| 7,270,551 B2 | 9/2007 | Busse et al. | 439/76.1 |

FOREIGN PATENT DOCUMENTS

| | | |
|---|---|---|
| DE | 298 08 003 | 8/1998 |
| DE | 100 29 649 | 1/2002 |
| EP | 0 651 465 | 5/1995 |
| EP | 0 671 856 | 9/1995 |
| EP | 0609552 A2 | 5/1998 |
| FR | 2 704 360 | 10/1994 |
| GB | 2 286 731 | 8/1995 |
| JP | 9-232049 | 9/1997 |

OTHER PUBLICATIONS

English Abstract of previously submitted European reference No. EP 0609552 A1.

English Abstract of previously submitted German reference No. DE 10029649.

English Abstract of previously submitted French reference No. FR 2704360.

* cited by examiner

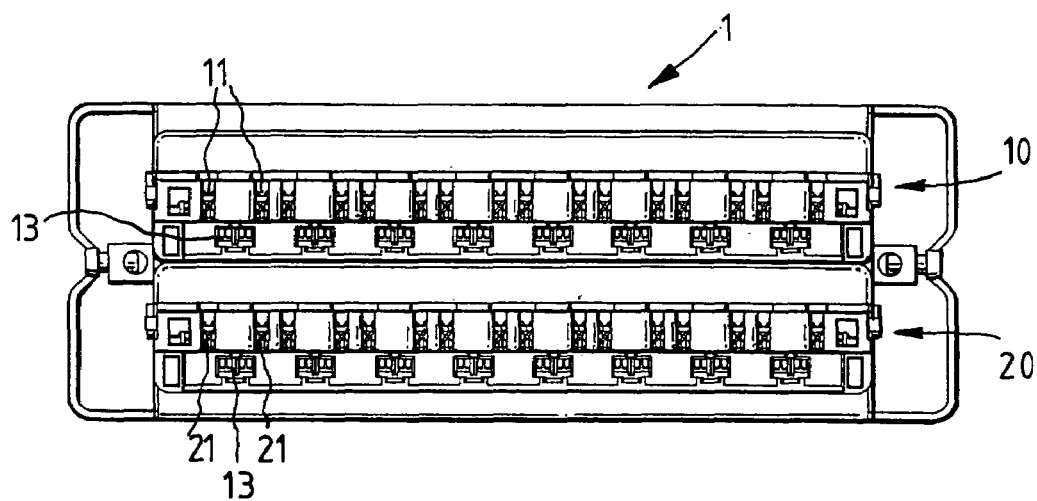
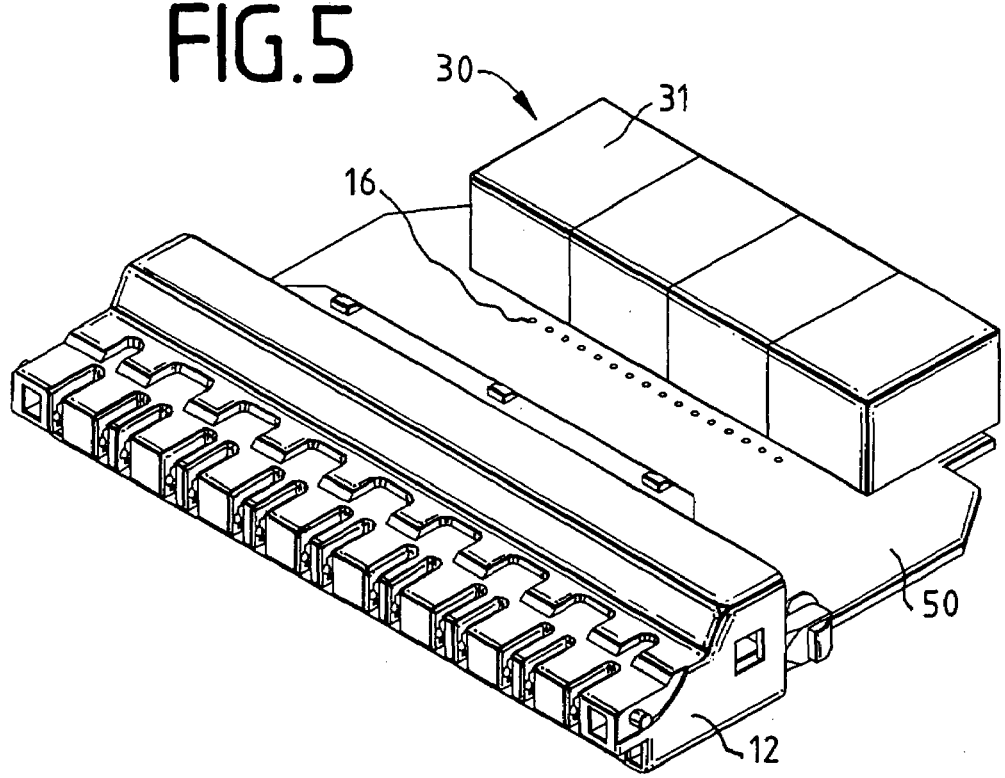

DISTRIBUTOR CONNECTION MODULE FOR TELECOMMUNICATION AND DATA TECHNOLOGY

BACKGROUND

Summary

Conventional distribution box connection modules for communications and data technology have two rows of connection contacts which are arranged on one end face of a housing. A distribution box connection module such as this is known, for example, from DE 27 25 551. The distribution box connection module has a first row of connection contacts on the cable face and, opposite this, a second row of connection contacts on the jumper face, in which case the contacts on the cable face may be regarded as input contacts while the contacts on the jumper face may be regarded as output contacts, although the information flow may be reversed. Center contacts are arranged between the rows, and test plugs or protection plugs can be inserted into them. One example of such protection plugs is three-point or five-point overvoltage protection modules or staggered protection circuits. If such overvoltage protection is now inserted into the center contacts, then this center tap, and in some cases also adjacent center taps, is or are no longer accessible for test purposes, and the overvoltage protection must be removed again for test purposes, so that the contact is not protected in this time.

A distribution box connection for telecommunications and data technology is known from DE 100 29 649 A1, comprising a housing in which externally accessible input and output contacts are arranged for the connection of cables or cores, with the housing having a cavity in which functional elements are arranged between the input and output contacts. The input and output contacts may in this case be arranged in the same end face of the housing or else on opposite end faces, with the input contacts being associated with one end face, and the output contacts being associated with the other end face. This results in clear separation between the cable face and the jumper face, with the individual cores and cables not interfering with one another.

STM1 interfaces, among others, are used in the transmission network between the nodes in the telecommunications network and are connected to a large number of transmitters and receivers which, for example, are formed by electronic units, and with the transmission capacity at the moment, for example, being 2 Mbit/s per channel.

The invention is thus based on the technical problem of providing a user-friendly distribution box connection module for telecommunications and data technology, in particular for use in transmission networks between the nodes. The input contacts are in the form of at least two mutually opposite rows of contacts, and the output contacts are in the form of at least one plug connector. At least two of the input contacts in the first row and least two of the input contacts in the second row are connected to the output contacts in the at least one plug connector. The input contacts in the first row and in the second row are connected via the at least one printed circuit board to the output contacts in the plug connector. In consequence, four cores can be associated one channel, with two cores being used for reception and two cores for transmission of data. On the output side, in this case, the jumpering via the plug connector is very simple, so that it is possible to use prefabricated cables.

On the input side, the distribution box connection module is user-friendly since all the cores for receiving data for the subscriber can be associated with one row of input contacts, and all the cores for transmitting data for a subscriber can be associated with the other row of input contacts. The input side thus provides clear separation between the transmission mode and the reception mode, in a similar way to that in conventional strip connectors, with the system face and jumper face being separated via the two rows of connection contacts. The electrical connection of the associated input contacts in the first row and in the second row to their shared plug connector is in this case made via the at least one printed circuit board.

In one preferred embodiment of the invention, the input contacts in the first row and in the second row are in the form of insulation displacement terminal contacts.

In a further preferred embodiment, the plug connectors are in the form of RJ-45 female connectors. In embodiments where one channel has only four associated cores, only four contacts of the RJ-45 female connector are connected in a corresponding manner to the input contacts, with the contacts 3-6 being connected, by way of example, while, the contacts 1, 2, 7, 8 remain unconnected (numbering of the contacts in accordance with RJ-45).

The plug connectors are preferably likewise arranged in two mutually opposite rows. In this case, the electrical connections between the input and output contacts are in some cases crossed over, since two cores must be routed from each plug connector to the first row, and two cores must be routed from each plug connector to the second row of the input contacts.

In a further preferred embodiment, two mutually opposite printed circuit boards are thus arranged within the housing and are electrically connected to one another, with the crossover being provided via the electrical connection. The two printed circuit boards are preferably electrically connected via a flat ribbon cable. However, in principle, other electrical connections such as plug contacts are also feasible.

In a further preferred embodiment, functional and/or protection elements are arranged on the printed circuit board and are electrically connected between the input and output contacts, such as filter or amplifier circuits, or overvoltage protection elements.

In a further preferred embodiment, the housing is formed in two or more parts, with at least one part of the housing being composed of metal. In addition to a pleasant design, the metallic housing allows direct formation with at least one grounding clip, which is formed from the housing and can be connected via contact pads to the printed circuit board. Furthermore, the metal housing is preferably formed with connecting elements for profiled rods and/or rails.

In addition, the input contacts preferably have associated isolating contacts, with each contact pair preferably having its own associated isolating contact for measurement and test purposes. Switching or connection contacts may also be used instead of isolating contacts.

BRIEF DESCRIPTION OF THE DRAWINGS

The invention will be explained in more detail in the following text with reference to a preferred exemplary embodiment. In the figures:

FIG. 4 shows a plan view of the distribution box connection module, FIG. 5 shows a perspective illustration of the printed circuit board with a front part.

DETAILED DESCRIPTION

Figure 1:
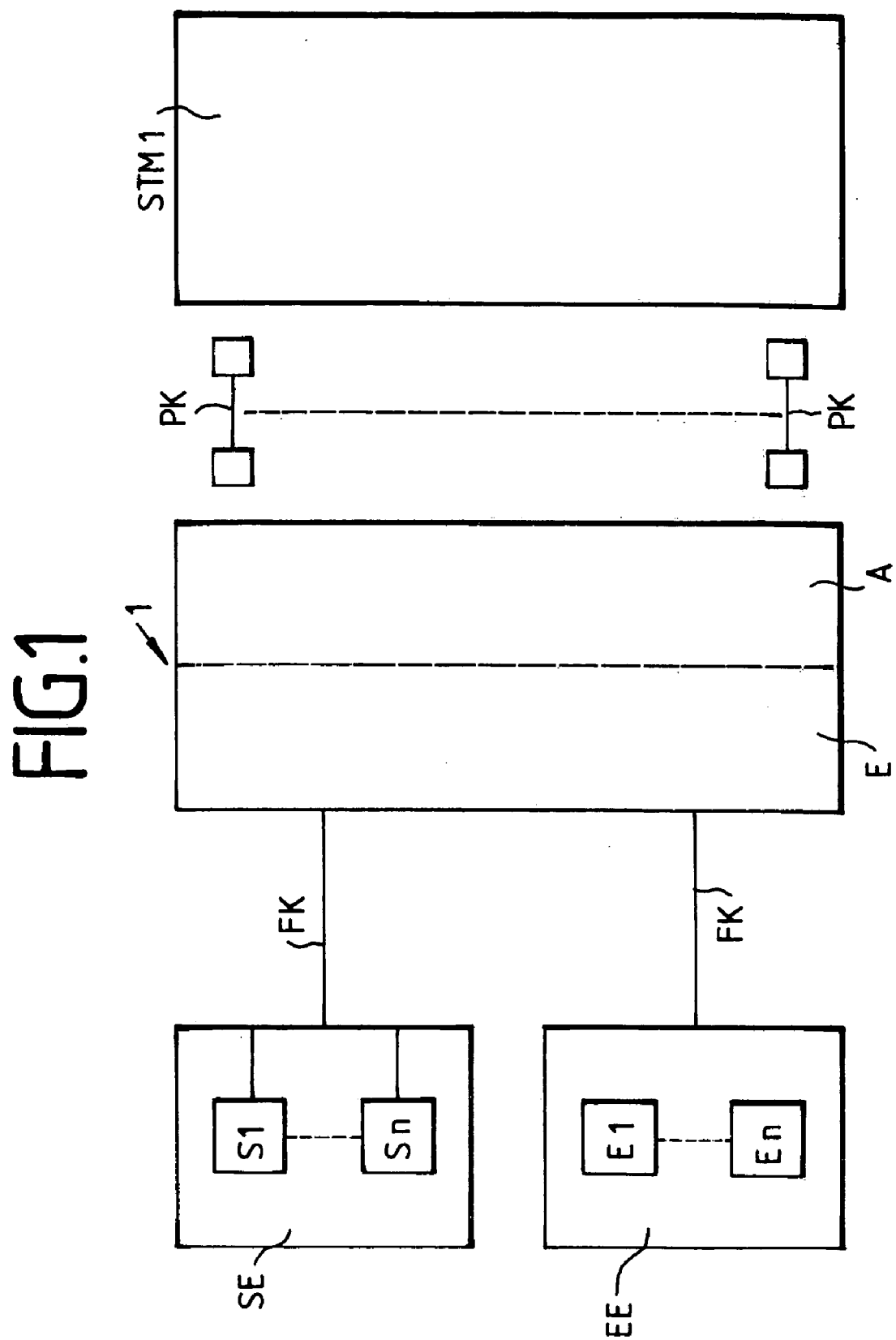
FIG. 1 shows a block diagram of a connection area around a distribution box connection module.

FIG. 1 shows the distribution box connection module 1 in one possible environment within a telecommunications network. The distribution box connection module 1 has an input side E and an output side A, with the expressions input side and output side being used only for definition purposes here, since the information flow takes place in both directions. Two or more transmitter modules $S_1$-$S_n$ and two or more receiving modules $E_1$-$E_n$ are arranged on the input side E. The transmission and receiving modules are in each case designed, for example, for a transmission capacity of 2 MB/s and are in the form of electronics units. The individual transmission modules S1-Sn may in this case also be combined in a higher-level transmitter unit SE. The receiving modules $E_1$-$E_n$ may likewise be combined to form a receiving unit EE. The connection between the transmission and receiving units SE, EE is made via conventional telecommunications cables FK, with one core pair, for example, in each case being associated with one module. An STM1 module based on SDH technology is arranged on the output side A, with the connection between the output side A and STM1 module being made via prefabricated patch cables PK. Core pairs which are associated with a common channel from transmission and receiving modules are then combined in the distribution box connection module 1 and are passed as a "channel cable" to the STM1 module. On the input side E, the cores are in this case separated on the basis of the transmission and receiving mode, as will be explained in more detail later, while, in contrast, channel separation is provided on the output side. In this case, it should be noted that the transmission and receiving units SE, EE can also be formed jointly as an STM1 module, that is to say with the distribution box connection module 1 being arranged between two STM1 modules.

Figure 2:
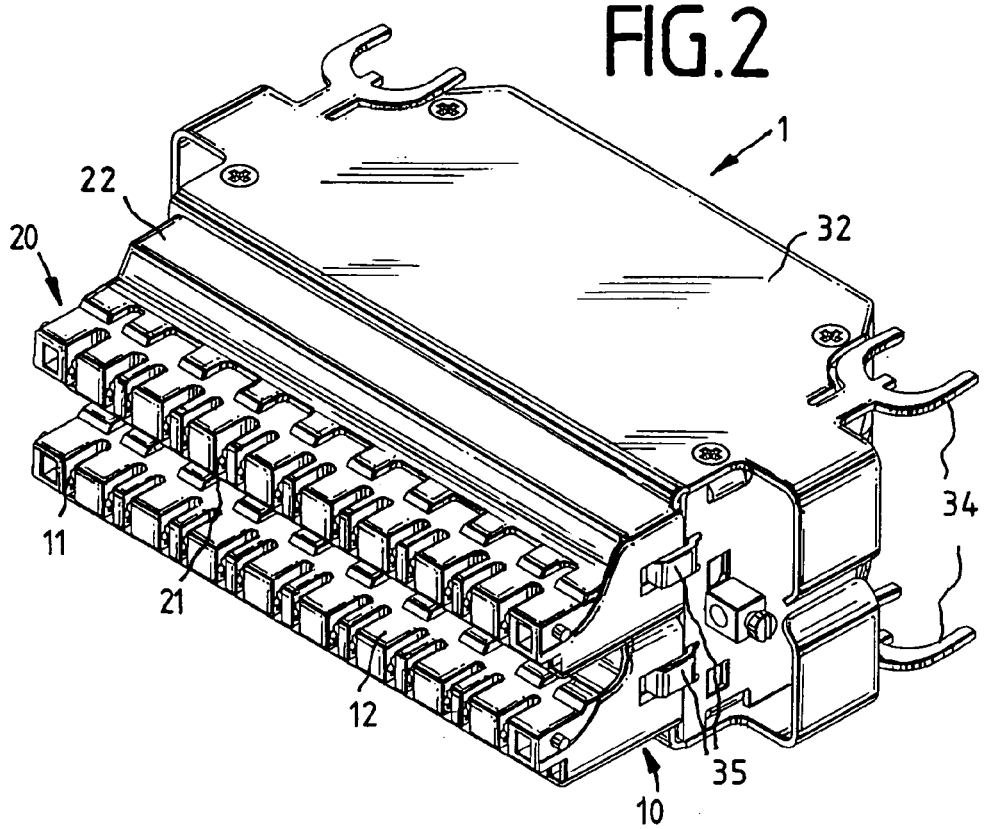
FIG. 2 shows a perspective front view of a distribution box connection module.
Figure 3:
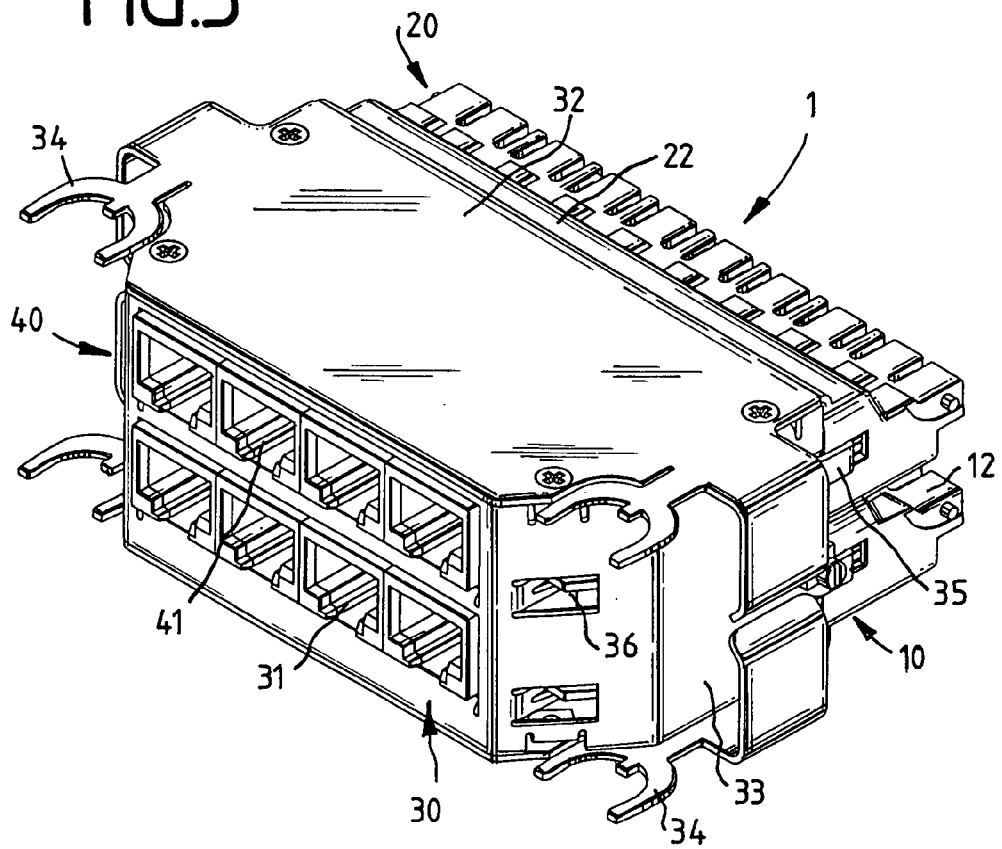
FIG. 3 shows a perspective rear view of the distribution box connection module.

FIGS. 2 and 3 show perspective views of the distribution box connection module 1. The distribution box connection module 1 has a first row of input contacts 10 and a second row of input contacts 20, which are arranged opposite one another.

In the illustrated example, each row has sixteen insulation displacement terminal contacts 11, 21 for connection of eight double cores. A first row of output contacts 30 and a second row of output contacts 40 are arranged on the opposite end face, with four output contacts in one row in each case being combined as a plug connector, in the form of an RJ-45 female connector 31, 41. The distribution box connection module 1 thus in each case has thirty-two input contacts 10, 20 and output contacts 30, 40. The distribution box connection module 1 also has two front parts 12, 22, which form a part of the housing and surround the input contacts 10, 20. The front parts 12, 22 are in this case preferably composed of plastic.

The output contacts 30, 40 are surrounded by two metallic side walls 32 and a metallic baseplate 33, which, together with the two front parts 12, 22, form the housing. The two side walls 32 can be screwed to the baseplate 33. The two side walls 32 each have two connecting elements 34, via which the distribution box connection module 1 can be latched onto a profiled rod system, which is not illustrated. The two front parts 12, 22 are connected to the baseplate 33 via latching tongues 35. Furthermore, the baseplate 33 has four grounding clips 36, via which an electrical connection can be produced to contact pads or printed circuit boards which cannot be seen. The input contacts 10, 20 are connected to the output contacts 30, 40 via these printed circuit boards. In this case, two input contacts 10 (which are associated with one double core) in the first row and input contacts 20 in the second row are in each case electrically connected to the output contacts 30, 40 of an RJ-45 female connector 31, 41 via the printed circuit boards. In this case, the input contacts 10 are only used for connecting cores via which data is transmitted to the STM1 module, and the input contacts 20 are only used for connecting cores via which data transmitted by the subscriber is transmitted. The four connected contacts in an RJ-45 female connector 31, 41 are thus connected to two input contacts 10 in the first row and to two input contacts 20 in the second row. If, for example, it is now intended to connect an RJ-45 female connector 41 to the associated input contacts 10, 20, then the connection for the input contacts 20 can be made virtually straight, while, in contrast, the connection from the input contacts 10 in the housing must be crossed over from top to bottom. The conditions for making contact with an RI-45 female connector 31 correspond to this, but are reversed. This crossing-over is preferably carried out via two mutually opposite printed circuit boards within the housing, as will be explained in more detail later. This means that the two transmission directions are arranged such that they are clearly separated from one another on the input side, which [lacuna] the connection, measurement and testing. On the output side, on the other hand, prefabricated cables can be used very easily and in a simple manner for jumpering since the output contacts which are associated with one channel are integrated in one plug connector. Since, normally, jumpering has to be carried out more frequently on the output side than on the input side, the connecting elements 34 may also be reversed so that the RJ-45 female connectors 31, 41 are freely accessible after latching onto the profiled rod. More or less than eight channels may, of course, be connected in one distribution box connection module 1.

FIG. 4 shows a plan view of the distribution box connection module 1. In this case, each associated pair of input contacts 10, 20 has an associated externally accessible isolating contact 13, and in this context reference may be made, for example, to DE 100 29 649 A1 with regard to the configuration of the isolating contact 13. At this point, it should be noted that the input contacts may also be formed with further contacts for connection of a shield. In this case, three insulation displacement terminal contacts 11, 21 would in each case be associated with one double core. Four RJ-45 female connectors 31 are arranged on the face of the printed circuit board 50 which faces the output side. The front part 12 is latched by means of the insulation displacement terminal contacts 11 onto the face of the printed circuit board 50 which faces the input side, with the insulation displacement terminal contacts, which are formed with fork contacts, being pushed onto contact pads on the printed circuit board 50. The input contacts of these contact pads are then connected via core tracks, which are not shown, to contact points 16 and/or directly to RJ-45 female connectors 31.

Figure 6:
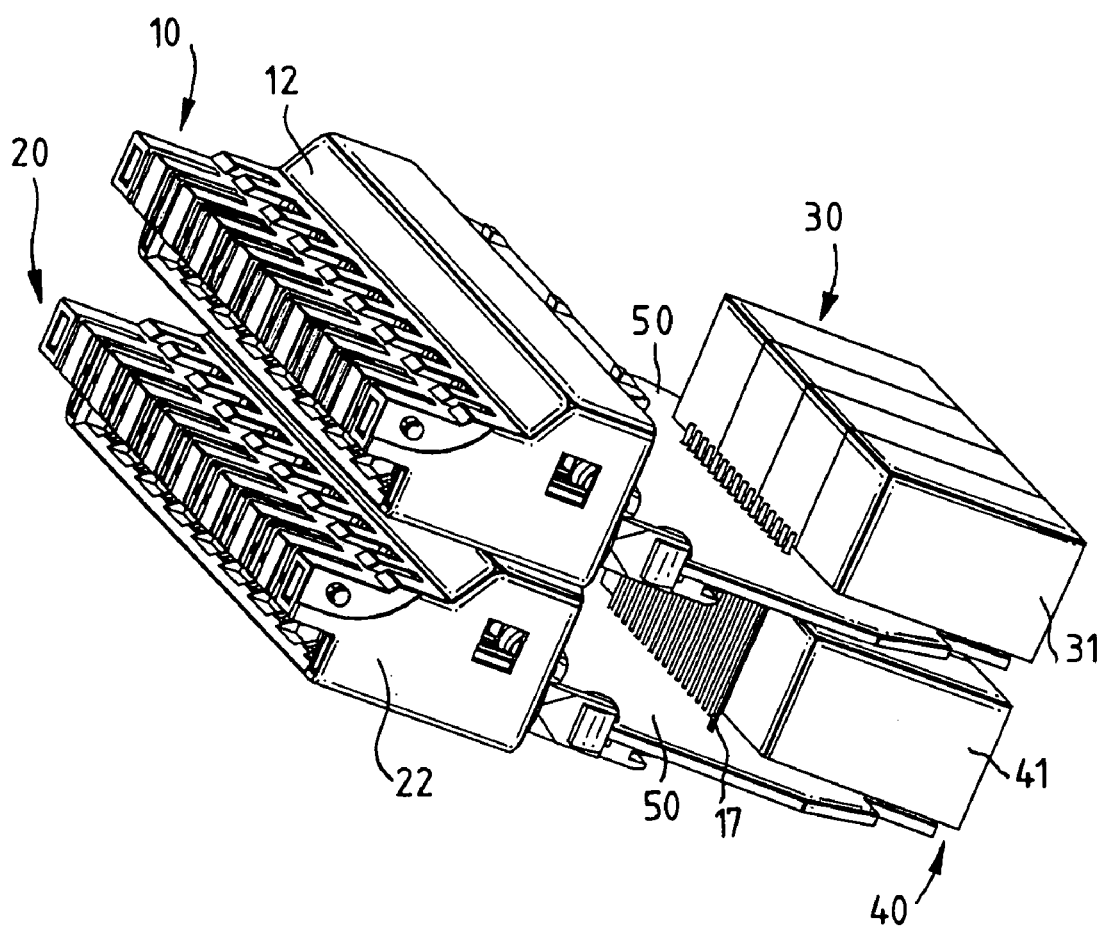
FIG. 6 shows a perspective illustration of two printed circuit boards with a front part.

FIG. 6 shows two printed circuit boards 50 as shown in FIG. 5, which are connected to one another via a flat ribbon cable 17 at the contact points 16. Eight input contacts 10 are looped through to the lower printed circuit board 50 and eight input contacts 20 are looped through to the other printed circuit board 50, via, respectively, the contact points 16 and the flat ribbon cable 17.

The distribution box connection module 1 may be extended in a modular fashion, so that a large number of rows may be arranged horizontally instead of the two rows of input and output contacts described. Furthermore, one plug connector may also have more than four associated cores.

LIST OF REFERENCE SYMBOLS $S_1$-$S_n$ Transmission modules
$E_1$-$E_n$ Receiving modules
SE Transmission unit
EE Receiving unit
FK Telecommunications cable
PK Patch cable
STM1 STM1-module
E Input side
A Output side
1 Distribution box connection
10 Input contact
11 Insulation displacement terminal contact
12 Front part
13 Isolating contact
16 Contact point
17 Flat ribbon cable
20 Input contact
21 Insulation displacement terminal contact
22 Front part
30 Output contact
31 RJ-45 female connector
32 Side walls
33 Baseplate
34 Connecting elements
36 Grounding clip
40 Output contact
41 RJ-45 female connector
50 Printed circuit board

The invention claimed is:

1. A distribution box connection module for telecommunications and data technology, comprising
   a housing in which externally accessible input and output contacts are arranged for connection of cables and cores, the housing having a cavity in which at least one printed circuit board is arranged, the input and output contacts being arranged on opposite end faces of the housing, and the input contacts being associated with one input side and the output contacts being associated with one output side,
   wherein the input contacts are in the form of at least two mutually opposite rows of contacts, and the output contacts are in the form of at least one plug connector, with at least two input contacts in the first row and at least two input contacts in the second row being connected to the output contacts in each plug connector, and with the input contacts in the first row and in the second row being connected via the at least one printed circuit board to the output contacts in the plug connector.

2. The distribution box connection module as claimed in claim 1, wherein the input contacts are in the form of insulation displacement terminal contacts.

3. The distribution box connection module as claimed in claim 1, wherein the plug connector is in the form of an RJ-45 female connector.

4. The distribution box connection module as claimed in claim 1, wherein the output contacts are in the form of two mutually opposite rows of plug connectors.

5. The distribution box connection module as claimed in claim 1, wherein two mutually opposite printed circuit boards are arranged within the housing and are electrically connected to one another.

6. The distribution box connection module as claimed in claim 5, wherein the printed circuit boards are connected to one another via a flat ribbon cable.

7. The distribution box connection module as claimed in claim 1, wherein function and/or protection elements are arranged on the printed circuit board, and are arranged electrically between the input and output contacts.

8. The distribution box connection module as claimed in claim 7, wherein the protection elements are in the form of overvoltage protection elements or circuits.

9. The distribution box connection module as claimed in claim 1, wherein the housing is formed from two or more parts, with at least part of the housing being composed of metal.

10. The distribution box connection module as claimed in claim 9, wherein the metal housing is formed with grounding clips, which are connected to contact pads on the printed circuit board.

11. The distribution box connection module as claimed in claim 9, wherein the metal housing is formed with connecting elements for profiled rods and/or rails.

12. The distribution box connection module as claimed in claim 1, wherein the input contacts have associated isolating contacts.

13. A distribution box connection module for telecommunications and data technology, comprising:
    a housing having a first end face and a second, opposite end face;
    a printed circuit board mounted to the housing;
    a first row of input contacts arranged on the first end face of the housing, the input contacts of the first row being configured to receive wire cores from outside the housing;
    a second row of input contacts arranged on the first end face of the housing opposite the first row of input contacts, the input contacts of the second row being configured to receive wire cores from outside the housing; and
    a plug connector arranged on the second end face of the housing, the plug connector being configured to receive a cable plug from outside the housing, the plug connector electrically coupled to at least two input contacts of the first row and at least two input contacts of the second row via the printed circuit board.

14. The distribution box connection module as claimed in claim 13, wherein the output contacts are in the form of two mutually opposite rows of plug connectors.

15. The distribution box connection module as claimed in claim 13, wherein two mutually opposite printed circuit boards are arranged within the housing and are electrically connected to one another.

16. The distribution box connection module as claimed in claim 13, wherein the housing is formed from two or more parts, with at least part of the housing being composed of metal.

17. A distribution box connection module for telecommunications and data technology, comprising:
    a housing in which externally accessible input and output contacts are arranged for the connection of cables and cores, with the housing having a cavity in which at least one printed circuit board in arranged, with the input and output contacts being arranged on the opposite end faces of the housing, and with the input contacts being associated with one input side and the output contacts being associated with one output side,
    wherein the input contacts are in the form of at least two mutually opposite rows of contacts, and the output contacts are in the form of at least one plug connector, with at least two input contacts in the first row and at least two input contacts in the second row being connected to the output contacts in each plug connector, and with the input contacts in the first row and in the second row being connected via the at least one printed circuit board to the output contacts in the plug connector;

wherein the input contacts are in the form of insulation displacement terminal contacts; and wherein the plug connectors are RJ-style connectors.

18. The distribution box connection module as claimed in claim 17, wherein the output contacts are in the form of two mutually opposite rows of plug connectors.

19. The distribution box connection module as claimed in claim 17, wherein two mutually opposite printed circuit boards are arranged within the housing and are electrically connected to one another.

20. The distribution box connection module as claimed in claim 17, wherein the housing is formed from two or more parts, with at least part of the housing being composed of metal.

* * * * *

UNITED STATES PATENT AND TRADEMARK OFFICE
CERTIFICATE OF CORRECTION

| | | |
|---|---|---|
| PATENT NO. | : 7,548,434 B2 | Page 1 of 1 |
| APPLICATION NO. | : 10/523565 | |
| DATED | : June 16, 2009 | |
| INVENTOR(S) | : Busse et al. | |

It is certified that error appears in the above-identified patent and that said Letters Patent is hereby corrected as shown below:

Col. 6, line 57, claim 17: "board in arranged," should read --board is arranged,--

Signed and Sealed this

Twenty-seventh Day of October, 2009

David J. Kappos
*Director of the United States Patent and Trademark Office*